(No Model.)
3 Sheets—Sheet 1.
C. A. WELLER.
BLOCK SIGNAL SYSTEM.
No. 505,802. Patented Sept. 26, 1893.
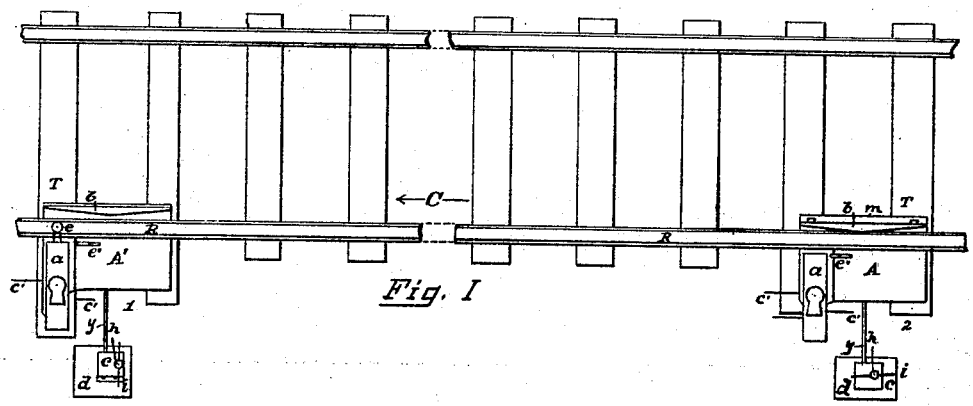
Fig. I
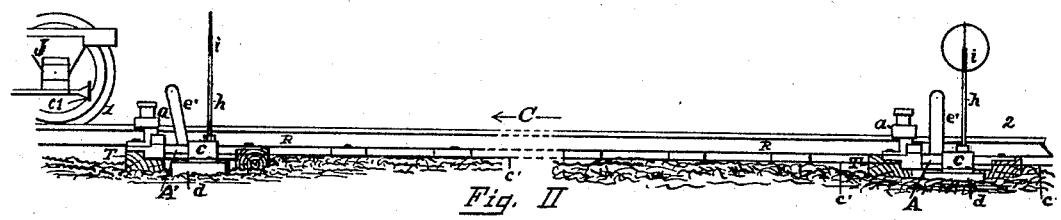
Fig. II
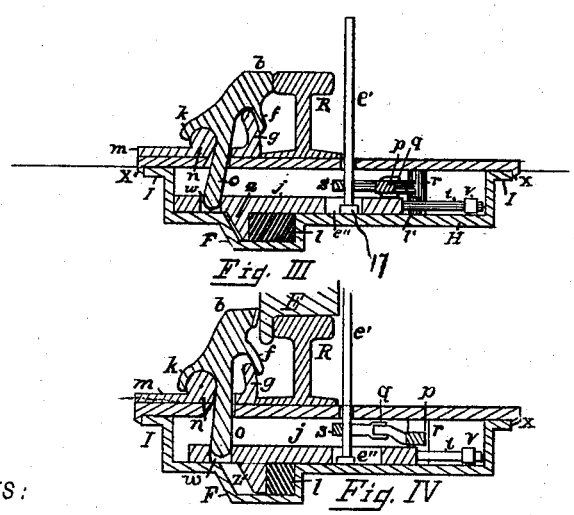
Fig. III
Fig. IV
WITNESSES:
Alonzo Drapis
John Gibney
INVENTOR
Chester A. Weller
BY
N. Anderson
ATTORNEY

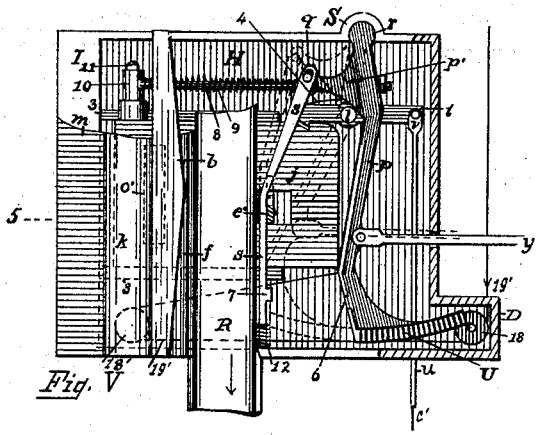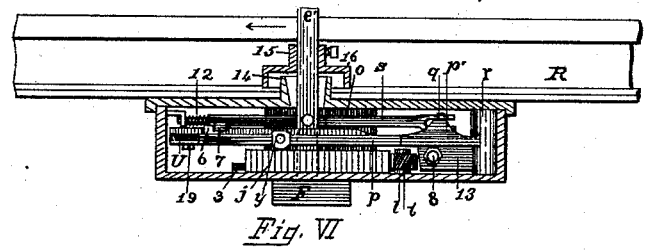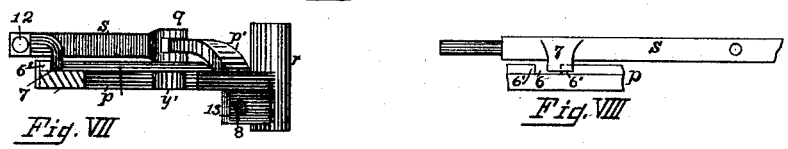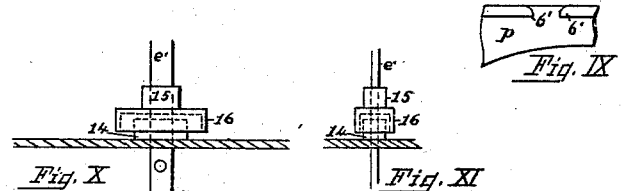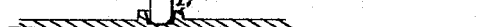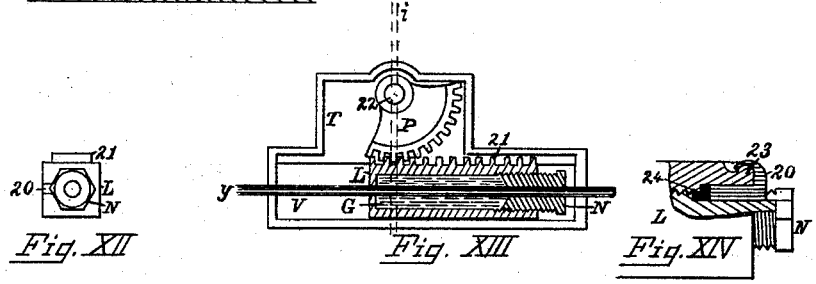

(No Model.)  3 Sheets—Sheet 3.
C. A. WELLER.
BLOCK SIGNAL SYSTEM.
No. 505,802. Patented Sept. 26, 1893.
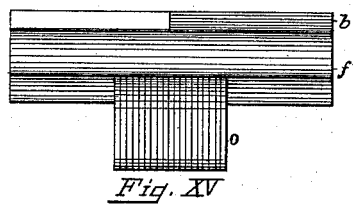
Fig. XV
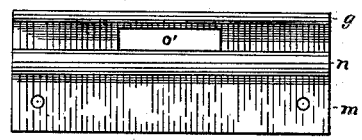
Fig. XVI
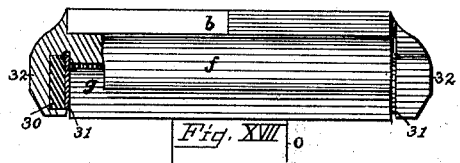
Fig. XVII
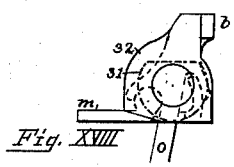
Fig. XVIII
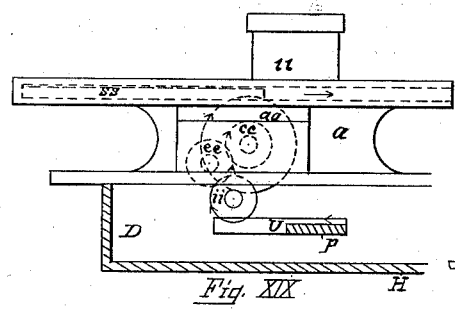
Fig. XIX
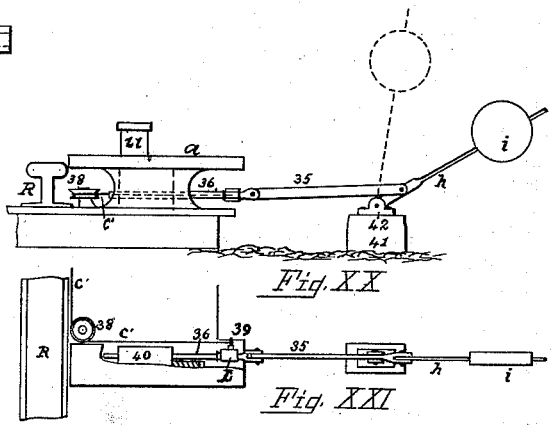
Fig. XX
Fig. XXI
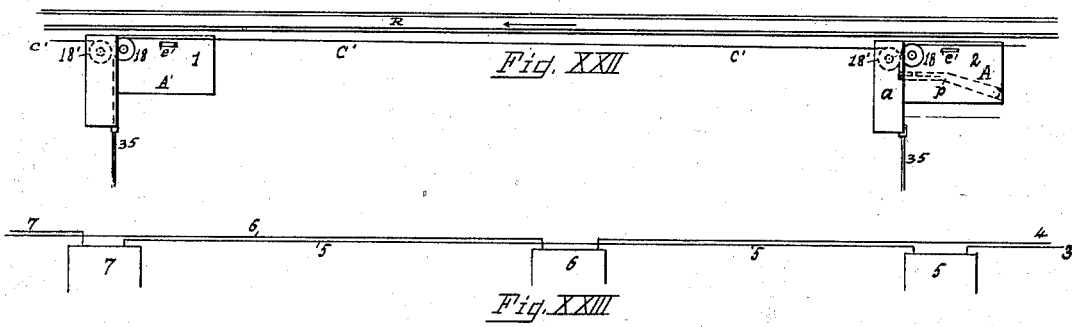
Fig. XXII
Fig. XXIII
WITNESSES:
Alonzo Drapes
John Gibney
INVENTOR
Chester A. Weller
BY
H. Anderson
ATTORNEY.

UNITED STATES PATENT OFFICE.

CHESTER A. WELLER, OF SING SING, NEW YORK.

BLOCK-SIGNAL SYSTEM.

SPECIFICATION forming part of Letters Patent No. 505,802, dated September 26, 1893.

Application filed March 19, 1892. Serial No. 425,519. (No model.)

*To all whom it may concern:*

Be it known that I, CHESTER A. WELLER, a citizen of the United States, and a resident of Sing Sing, in the county of Westchester and State of New York, have invented certain new and useful Improvements in Block-Signal Systems, of which the following is a specification; and I declare it to be a full, clear, and exact description of my invention, that will enable others skilled in the art to which it appertains to make and use the same, reference being had to the accompanying drawings.

The object of my invention is to produce a simple mechanical system by which a moving train may automatically place a torpedo or set a visual signal or both, at intervals in its rear or in its advance or both, removing others previously placed or set; a system that will afford audible and visual signals together or singly, and without human aid; and that shall be free from delicate and uncertain appliances as necessarily attend electrical systems. While it is herein shown to incorporate with it a torpedo setting and retracting machine for which a patent of the United States has been granted to me, No. 470,729, dated March 15, 1892, it will appear obvious that any similar machine may be employed in its stead. The manner of attaining these objects is herein fully described, and shown in the accompanying drawings, in which—

Figure I represents the plan of a section of rail road track with my system applied. Fig. II is the same section of track in elevation indicating the action of the visual signals. Fig. III is a transverse sectional view of the signaling machine in which the parts are at rest. Fig. IV is a like sectional view showing the position of the parts when they are caused to place a signal. Fig. V is a top view of the signaling machine with enough of the covering removed to show the internal mechanism. Fig. VI is a vertical cross section through the broken line 5 Fig. V. Fig. VII is an end view of the levers that actuate the torpedo and semaphore signaling devices, and Figs. VIII and IX are enlarged details of parts of the same levers. Figs. X and XI explain a device for excluding foreign matter from entering the casing by way of the opening for the lever e. Figs. XII, XIII and XIV represent details of mechanisms employed in operating the semaphore signals. Fig. XV represents the striking piece acted upon by the car wheel, and Fig. XVI is the base plate on which the striking piece rests. Fig. XVII represents a means of cushioning the ends of the striking piece, and making them water tight. Fig. XVIII is an end view of Fig. XVII. Fig. XIX shows how the torpedo machine may be geared to connect with the mechanism shown in Fig. V. Fig. XX represents a method of advance signaling, and a plan of the same is shown in Fig. XXI. Fig. XXII shows its application to a road. Fig. XXIII represents a system of "overstringing."

A general understanding of the system about to be described may be had by reference to Figs. I and II. A, A', represent signaling machines placed at suitable intervals or blocks on a rail road. On the inside of the rail a hinged striking plate $b$ rests against the rail, and is adapted to be actuated by the passage of the flange of the car wheel between it and the rail. At No. 2, Fig. I, this plate is shown in its normal position, and at 1 it is in the position to which it would be moved by the passage of a car wheel. The movement of this plate actuates mechanisms in the box outside of the track which causes the turning of the semaphore signals $i$, and the operation of the torpedo placing machines $a$, causing the semaphore to indicate danger as at No. 1, and placing a torpedo on the rail. The machine A' is connected with the one indicated by A, by a line $c'$, by means of which the setting of the former will trip the latter, and restore the signals to safety, and withdraw the torpedo from the rail. Fig. II is a view of the same devices in elevation, as seen outside the track.

Fig. III is a vertical transverse section through the signaling machine at line 5, Fig. V showing that the casing H incloses all the moving parts except the upper portion of the striking parts and the lever $e'$. A slide $j$ moving in guides (3, Fig. V) on the floor of the casing, is slotted at $w$ to receive the end of the lower projection $o$ of the striking plate. On its under side it is provided with a lug $z$ extending down into the pocket F in the floor of the casing, which contains a spring, preferably of rubber, as $l$. This spring keeps the slide and striking plate in their normal positions as shown in Figs. I and III. Another slot $e''$ is made in the slide to accommodate the lever $e'$ and its socket, which is also in the bottom of the casing. The striking plate $b$ has a rearwardly curved flange $k$, and one, $f$, extending forward. The flange $k$ fits over a round rib or bearing $n$ on the plate $m$, and the flange $f$ fits over a flange $g$ rising from the same plate. The peripheries of these two bearings form arcs with the center of the rib $n$, so that as the plate $b$ is moved back and forth it turns on the rib $n$, and the flange $f$ maintains a continual bearing on the flange $g$. By reference to Figs. XV and XVI it will be seen that the lengths of the said rib $n$, and flanges $k$, $f$ and $g$, are coincident in length with the portion that is to be acted on by the car wheel; and in Fig. V they are shown to be the length of the casing H. It will be plain that these long bearings will afford solidity and steadiness, and will make water and dust proof joints, preventing the passage of all foreign matter through the slot $o'$ in the plate $m$.

A top view of the striking plate as seen in Fig. V shows that its center rests against the rail, while the faces fall away obliquely toward both ends, making a space at the beginning wide enough to receive the flange of the car wheel; and as the wheel advances it forces the plate back with a gradual movement, avoiding a sudden shock to the machine.

In Fig. IV a car wheel E is represented as having forced the striking plate backward. This carries the arm $o$ forward and it forces the slide $j$ forward with it, and in doing so compresses the rubber spring $l$. The effect of pushing the slide $j$ forward will be understood by reference to Fig. V. Near the end of the slide it is provided with a notch into which the lever $t$ hooks as shown, when the slide is thus pushed forward. The hook will be kept in place by the spring 4 until it is released through the rod $u$, which will take place when the train reaches the machine in the next block, when, in setting that, a strain will be put upon the rod $u$ through the line $c'$, releasing the lever $t$, allowing the slide and all connected with it to return to normal places. Within the casing a swing lever $p$ is hinged by means of its rounded supporting end $r$ being thrust in a socket S formed in one end of the casing. The normal position of this lever is shown by the broken outlines. This lever is connected with the slide $j$ by means of a rod 8 which passes through a web 13 on the under side of the lever, as in Figs. VI and VII. The rod has a head 10 which is supported on a stud 11, projecting from the side of the slide. Nuts on the outer end of the rod limit the movement of the lever $p$, and a spring 9 between the head 10 and the web 13 tends to force the lever toward the nuts. Pushing the slide forward, however, compresses the spring 9 without moving the swinging lever $p$. Upon the end of the said lever, near its socket end, a branch $p'$ is provided, to which an arm $s$ is pivoted with an elongated slot at the joint $q$. A lever $e'$ having a pivotal bearing 17 in the bottom of the casing, as shown in Fig. X, is pivoted about midway of the arm $s$, as in Fig. VI. The other end of the arm has a bearing in the casing. The arm has a short lateral movement upon its holding stud at $q$, and a spring 12 pushing against a shoulder on the arm tends to always force it toward the stud. Near its spring end it has a hook 7. This hook is adapted to pass through the notch 6 cut through the raised flange along the back edge of the lever $p$, and to slide along the inner edge of such flange far enough to hook upon it and hold it fast, when the relative position of the two—the lever $p$ and the arm $s$—becomes as indicated by the broken lines.

Fig. VI illustrates the hook caught on the flange.

Fig. VII is a view looking at the end of the two—the arm and the lever—when they are united, the lever $p$ being shown broken through the notch 6.

In Fig. IX the ends of the flanges 6', 6', are shown to be beveled off so as to allow the hook 7 to snap, as a latch into its place as shown in enlarged form in Fig. VIII. Now when the slide is pushed forward and is caught by the hook, the spring 9 is compressed but no movement of the swinging lever can take place until it is released by the hook on the arm $s$. Throwing the lever $e'$ in the direction of the arrow (see Fig. VI) moves the arm $s$ the same direction and the hook is caused to release the lever $p$, which will move to the position shown in Fig. V. While pushing the slide $j$ forward will not release the lever $p$, when all the parts are as shown in Fig. V, releasing the slide $j$ from the hook $t$ will cause not only its return to its place, but by means of the nuts on the end of the rod 8 it will cause the return of the swinging lever and all the other parts to their respective normal places. But, when the parts are all in the positions shown in the figure, throwing the lever $e'$ to a vertical position will, through the arm $s$ and branch $p$, cause the return and re-locking of the swinging lever, without interfering with the slide and its connections. The purpose of this operation will be explained in connection with a reference to the backing of trains.

At a suitable place on the lever $p$ a connecting rod $y$ may be attached for operating a semaphore signal, as at $d$, $d$, Figs. I and II, the outer end of the rod being connected by means of a toothed rack L and sector P, Fig. XIII, the axis 22 of the sector having at its top a target as indicated by the broken lines $i$. Of course a crank connection may be used, but I show the rack and sector for a purpose to be further explained.

It will be apparent that this machine, without further attachment would be complete for the purpose or a visual signal; but as my aim is an absolutely certain signal, I combine with it an audible signal.

The outer end of the lever $p$, Fig. V, is shown to be provided with a toothed segment. The object is to gear it to a torpedo machine as indicated in Fig. XIX, in which H, D represent the casing, U the segment end of the lever $p$. The segment by means of intermediate gears $ii$, $ee$, communicates motion to the pinion $cc$ which is fast to the wheel $aa$. The wheel $aa$ is in turn geared into a rack in the bottom of the slide $ss$.

$tt$ represents a torpedo magazine, and from it torpedoes drop into the passage partly occupied by the slide $ss$. The torpedo is grasped by mechanism on the end of the said slide, and as the slide is pushed forward by the action of the wheels the torpedo is placed on the rail of the track. A reversal of the wheel movement by the return of the swinging lever, returns the slide $ss$, and with it the torpedo, if it has not been exploded. The torpedo machine shown is one for which a patent of the United States is about to issue to me, and I therefore do not show it here in all its details. The action of the swinging lever $p$ operates the torpedo machine in the manner described and places a torpedo on the track at the same instant of setting the semaphore signal.

It is obvious that instead of the gearing connections with the torpedo machine, a lever arrangement may be substituted to answer the same purpose.

The operation of the system is as follows: It is to be actuated by the flange of a car wheel, and it is plain that the first truck wheel of the train will set the machine. Since the flanges of the wheels do not always hug the edges of the rails, but are allowed more or less lateral play, the entrance between the striking plate and the rail is of sufficient width to admit the flange when running the greatest distance from the rail. Since the setting of this machine will require little power and cannot force the flange against the rail, when the flange is running away from the rail the distance moved by the striking plate and the slide $j$ must necessarily be greater than when the flange is close against the rail. The hook $t$ is set so as to catch the slide when at its minimum movement, so that the maximum movement will simply push the slide a little farther, but it will always be caught by the hook on its return, so that the greater movement cannot affect the machine. The truck wheel sets the slide only. Somewhere on the rear end of the train, preferably, perhaps, on the truck framing, a projecting arm C', Fig. II, will be attached, which, in its passage over the machine, will strike the lever $e'$. This will release the lever $p$, which will at once set the signals, and as the last truck is past, the signals will be in the rear of the train. As the train passes on to the next block, supposing the one just passed to be the first, the same operation will be effected; but in addition the first machine will be re-set in the following manner: By reference to Fig. V, it will be seen that a line $c'$ enters the casing, turns about sheaves 18, 18', and is secured to the end of the swinging lever $p$, so that releasing the lever causes the line to move in the direction of the arrow. This line continues back to the preceding machine, as at $c'$, $c'$, Fig. II, and is there connected to the hook $t$ as in Fig. V, so that when it is pulled by the lever at the second block it causes the release of the hook $t$ in the preceding machine, and the restoration of all its parts to normal. Thus each machine is connected with the preceding one, and as one is set to danger the preceding one is re-set to safety. If, after the train has passed and set its signal, it is necessary for the train to move back over the machine, the same arm C' Fig. II, that first struck the lever $e'$ and set the signals, will now again strike it and will re-set the swinging arm and restore its signals. Thus a train may run back and forth over a machine keeping torpedoes out of its way, and leaving one set when it finally passes on. This is one advantage of having the swinging or signal setting lever operative independently of the slide $j$. Another advantage is this: Of course the train must be out of the way before torpedoes are placed on the track. While the torpedoes must be set by some device, at the rear of the train I make use of the force of the train to store power in the spring 9 by which the torpedo is finally set by the arm described, which requires to be only an elastic projecting bar.

The casing H is designed to be covered with a top having drooped flanges around the edges, as at $x$, Fig. IV, for the purpose of keeping out water and all other foreign matter; to close the aperture through which the lever $c'$ projects I surround it with a raised flange 14, Figs. VI, X, and XI and over it secure an inverted cup 15, 16, substantially as illustrated.

In working a semaphore from the swinging lever $p$ it may not always be easy to equalize the movement of the lever and the sector of the semaphore. To obviate any trouble arising from this cause I provide a device shown in Figs. XII, XIII, and XIV. In the central figure it will be seen to consist of a box L through which the connecting rod $y$ passes, the box having an enlarged chamber for packing G and a packing nut N at one end. A rack 21 on its side engages with the sector P. The whole is inclosed within a casing T, V. The packing G is compressed upon the rod to give a sufficient amount of friction for the operation of the semaphore, but to admit of the sliding of the rod if the movement of the rod should exceed that required to operate the semaphore. To prevent the loosening of the packing, the nut N is secured by means of a key inserted in a keyway 24, Fig. XIV, provided in the nut and threaded portion of the chamber. A thin end of the key 20 is bent over a boss 23 to prevent its jarring out of place.

Reference to Figs. XVII and XVIII will explain a means of inclosing the ends of the striking plate and its supporting plate $m$, in a manner to exclude water, snow and dust from the opening at their ends when they are united. The ends $b, f$ are provided with lugs 32, 32, Fig. XVII, which are chambered on the inside to receive springs of rubber 30. Metal plates 31, 31, are laid on these springs, and when all are together and are forced over the rib $n$ and flange $g$ of the plate $m$, they will present the appearance shown at the right end of Fig. XVII, the plates 31 lying partly within the chamber for the springs to prevent their displacement. The end view Fig. XVIII will show by the broken lines how the plates 31 impinge against the ends of the parts of plate $m$. In addition to their action as packing, the springs take the force of the shock arising from the sudden contact of the car wheel with the striking plate.

These machines may be used for placing signals in advance of trains and for such purpose become very desirable on single track roads. Figs. XX, XXI, XXII illustrate a manner of connecting for this purpose. Referring to the latter figure it will be observed that a train moving in the direction of the arrow on the rail, in passing over machine No. 2 will when releasing the lever $p$, set the signal of No. 1 machine by means of the line $c'$. So each machine will set the signal belonging to the machine ahead of it. In Fig. XXI it will be seen that the line $c'$ coming from the preceding machine is connected to the head L which operates on a rod connected by rod 35 to the semaphore $i$ shown in elevation in Fig. XX. Rod 36 passing into the torpedo machine $a$ causes the deposit of the torpedo. When the swinging lever $p$ is re-set the semaphore falls to the ground by its own weight, and to insure its so falling it is never raised to quite a vertical position, but is allowed to lean a little as shown by the broken lines. To compensate for variations of movement the friction box Fig. XIII may be used on the rod operating the torpedo machine.

Fig. XXIII explains a system of connections between machines which I call "overstringing," and which possesses advantages in some situations. 5, 6 7 represent signal machines, and the connecting lines the wires that trip or re-set their respective machines. No. 5 machine is connected with No. 3, No. 6 with No. 4, No. 7 with No. 5 and so on, the machines being connected together two blocks apart. By carrying out the same idea they may be connected three or more blocks apart.

Having described my invention, what I claim, and desire to secure by Letters Patent of the United States, is—

1. A machine for a block signal system as described, comprising a striking plate actuated by the flange of a car wheel, a slide moved by the striking plate against a stout spring, and a locking hook, a swinging lever for actuating a torpedo machine and a semaphore signal, a locking arm for holding the swinging lever, a lever by which the swinging lever is released, substantially as shown and described.

2. In a signaling machine substantially as described the combination with the rails of a rail road track, of the striking plate $b$ riding on an elongated bearing $n$ and having a projection $o$ by which it operates the slide $j$, the slide $j$ having a lug on its under side bearing against a stout spring $l$, a hook $t$ adapted to catch in a notch in the side of the said slide, a stud in the side of the said slide supporting a rod 8 which passes through the lever $p$ having adjustable nuts on the outer end, and a spring between the head of the rod and the said lever $p$ by means of which the lever is held in the direction of the said nuts, a swinging lever $p$ with a branching arm supporting a sliding arm $s$ for locking the said lever in the manner described, a toothed segment on its end for gearing with a torpedo machine, and a rod connection near its end for operating a semaphore signal, and a lever $e'$ pivoted in the bottom of the machine and adapted for unlocking the signal setting lever, all substantially as herein shown and described.

3. In a signaling machine, substantially as described, the combination of the striking plate $b$ and its supporting plate $m$ the former having a flange $k$ fitting over a cylindrical rib $n$ on the plate $m$ on which it rocks, and a flange $f$ fitting the flange $g$ also on the base $m$, the arcs of the touching faces of the two flanges being common to the center of the rib $n$, substantially as and for the purpose described.

4. In a signaling machine substantially as shown, a striking plate and its bearing plate as combined, the former having its face next the rail beveled from the center toward the ends as shown, a flange $k$ riding on the cylindrical bearing $n$ on the base, flanges $f$ and $g$ with their touching faces concentric with the face of the rib $n$, and an arm $o$ extending from the center of the striking plate through an opening $o'$ in the base, substantially as shown and described.

5. In a signaling machine substantially as shown, the combination of the striking plate with its base in the manner described, the striking plate having lugs on its ends recessed to receive springs and end bearing plates, substantially as and for the purposes described.

6. In combination with the slide $j$ and its actuating mechanism, the pivoted swinging lever $p$, the locking arm $s$, lever $e'$ pivoted in the bottom of the machine and to the arm $s$, rod 8 with adjustable nuts on its outer end, spring 9, head 10 and stud 11, substantially as shown and described.

7. In a signaling machine as described, a swinging lever, substantially as described, provided with locking devices consisting of a slightly sliding arm united to the lever by an elongated slot on a stud, and provided with a spring pushing the arm in the direction of its pivot, and said sliding arm provided with a hook near its end which passes through a notch in the back flange on the lever, and catches on said flange, substantially as shown and described.

8. In combination with the swinging lever and locking arm substantially as described, a lever $e'$ by means of which the locking device is released, and through which and the arm $s$, the lever may be re-set and locked, substantially as described.

9. In a signaling machine as described, the combination with the swinging lever actuated by the spring 9, the arm $s$, and lever $e'$, the striking arm $C'$ attached to a car, substantially as shown.

10. In a signaling machine substantially as described a swinging lever with locking and actuating devices as described, provided at its outer end with a toothed segment for gearing to a torpedo machine, substantially as described.

11. The combination with a signaling machine as described, of the lever $p$, segment U, and intermediate gearing connecting with the slide $ss$ in a torpedo machine, as and for the purpose described.

12. For the purpose of a mechanical block signal system substantially as herein shown and described, a movement compensating device consisting of a box chamber for packing and provided with a packing gland, the rod for operating a semaphore or torpedo machine passing through the same, the box having a rack or stud connection on its side for performing the work of the rod, whereby the movement of the rod need not be limited by the movement of the rack or stud, substantially as described.

13. In a movement compensating device for the purpose of a signaling system as described, the box L, chambered and provided with a packing gland N, key 20 bent over a boss 23, rod $y$, packing G and rack 21, substantially as shown.

14. In combination with the covering of the casing H and the lever $e'$, the flange 14, and cup 16 inverted over the said flange, and held to the lever $e'$ by the hub 15, substantially as shown.

CHESTER A. WELLER.

Witnesses:
 JOHN GIBNEY,
 ALONZO DRAPER.